US007983324B2

(12) United States Patent
Wu et al.

(10) Patent No.: US 7,983,324 B2
(45) Date of Patent: Jul. 19, 2011

(54) SYMBOL BOUNDARY ACQUISITION APPARATUS AND METHOD THEREOF

(75) Inventors: Kuo-Ming Wu, Nan-Tou (TW); Der-Zheng Liu, Tai-Nan (TW); Kuang-Yu Yen, Tai-Chung (TW)

(73) Assignee: Realtek Semiconductor Corp., Hsinchu (TW)

( * ) Notice: Subject to any disclaimer, the term of this patent is extended or adjusted under 35 U.S.C. 154(b) by 990 days.

(21) Appl. No.: 11/465,452

(22) Filed: Aug. 18, 2006

(65) Prior Publication Data

US 2007/0127607 A1 Jun. 7, 2007

(30) Foreign Application Priority Data

Aug. 19, 2005 (TW) .............................. 94128432 A

(51) Int. Cl.
*H04B 1/00* (2006.01)
(52) U.S. Cl. ........ 375/150; 375/142; 375/143; 375/152; 375/260; 375/343; 375/349

(58) Field of Classification Search .................. 375/150, 375/142, 143, 152, 260, 343, 349
See application file for complete search history.

(56) References Cited

U.S. PATENT DOCUMENTS

| 7,158,542 B1 * | 1/2007 | Zeng et al. ..................... 370/513 |
| 7,203,245 B1 * | 4/2007 | Murphy ......................... 375/260 |
| 2004/0170237 A1 * | 9/2004 | Chadha et al. ................. 375/343 |

* cited by examiner

*Primary Examiner* — Kabir A Timory
(74) *Attorney, Agent, or Firm* — Thomas, Kayden, Horstemeyer & Risley, LLP

(57) ABSTRACT

The present invention relates to a symbol acquisition apparatus and a method thereof. The method includes: determining a first boundary according to a first preamble symbol and generating a first confidence value according to signal quality of the first preamble symbol; determining a second boundary according to a second preamble symbol and generating a second confidence value according to signal quality of the second preamble symbol; and determining a symbol boundary from the first and the second boundaries according to the first and the second confidence values.

17 Claims, 3 Drawing Sheets

US 7,983,324 B2

SYMBOL BOUNDARY ACQUISITION APPARATUS AND METHOD THEREOF

BACKGROUND OF THE INVENTION

1. Field of the Invention

The present invention relates to a communication system, and more specifically, to a symbol acquisition apparatus and a method thereof.

2. Description of the Prior Art

Initially an ultra wideband (UWB) communication system was applied to military affairs. In recent years, the requirements of high-speed exchange techniques have rapidly increased. Hence, for the low-cost communication products, UWB communication systems have become more popular. In general, the bandwidth of UWB communication system is larger than 20% of the value of the related central frequency. That is, assume that the central frequency of the transmitted signal is 6 GHz and the transmitted bandwidth of the communication system is more than 1.2 GHz, and the communication system can be viewed as a UWB communication system. Compared with the signal bandwidth, 1.25 MHz, utilized by CDMA system, the UWB communication system is 1000 times bandwidth of the CDMA system.

The information of a traditional RF transmission is carried by a continuous wave. However, the UWB communication system utilizes a very short pulse wave to transmit information. Each pulse wave continues only about $1/10^{13}$ second. In this way, the energy provided by the UWB communication system distributes over a very broad band, rather than being clustered around a single carrier frequency. Therefore, the energy distribution on a unit bandwidth of the UWB communication system is substantially lower than the energy distribution of the related art communication technique. However, the UWB communication system lacks good ability of piercing through an obstacle. Additionally, it is easily affected by a multi-path effect and interfered by other wireless communication system.

Taking IEEE 802.15.3a specification as an example, there are four preamble symbols at the front end of a received packet. A related art UWB communication system perform a cross correlation on the four preamble symbols of the front end of the packet by match filter, and determines a preamble symbol boundary according to a maximum value of the calculating results. Because the above-mentioned preamble symbols are transmitted on different bands, the UWB communication system generates symbol boundaries corresponding to the preamble symbols. However, due to the UWB communication system is easily affected by the multi-path effect, the above-mentioned calculating results may contain a plurality of peek values. In this way, the system may misjudge the position of the maximum value and further generate a wrong symbol boundary. Additionally, comparing with other wireless communication systems, the energy of the UWB communication system is distributed over a broader band. Hence, when the band utilized by the UWB communication system overlaps the surrounding band utilized by other wireless devices, the signal-to-noise ratio (SNR) will be substantially reduced, further influence signal qualities and lower the correctness of the generated symbol boundaries.

SUMMARY OF THE INVENTION

One of the objectives of the present invention is therefore to provide a symbol acquisition apparatus and a related method for determining a symbol boundary, to solve the above-mentioned problem.

One of the objectives of the present invention is therefore to provide a symbol acquisition apparatus and a related method for determining a symbol boundary, to utilize a plurality of symbol boundaries to determine a preferred symbol boundary.

One of the objectives of the present invention is therefore to provide a symbol acquisition apparatus and a related method for determining a symbol boundary, to generate a plurality of confidence values to represent the correctness of the generated symbol boundaries to determine a preferred symbol boundary.

One of the objectives of the present invention is therefore to provide a packet detection method for determining that the UWB communication system has received a packet when the UWB communication system properly generates a symbol boundary.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
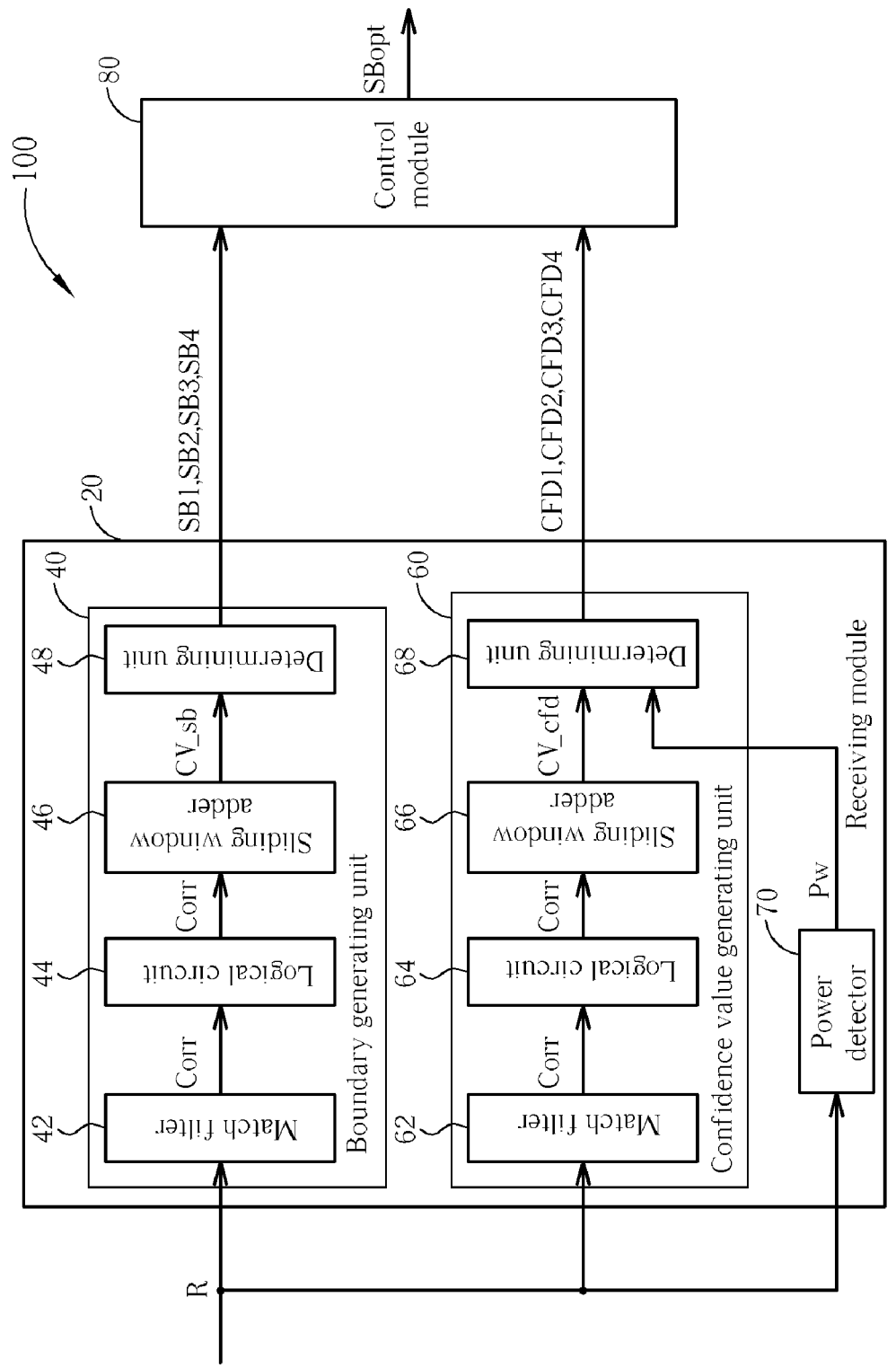
FIG. 1 is a block diagram of an embodiment of a symbol acquisition apparatus according to the present invention.

Please refer to FIG. 1. FIG. 1 is a block diagram of an embodiment of a symbol acquisition apparatus 100 according to the present invention. In the present embodiment, the symbol acquisition apparatus 100 is applied to a multi-band communication system. The front end of the received signal R shown in FIG. 1 comprises a plurality of preamble symbols, and after preamble symbols has a plurality of data symbols, wherein the preamble symbols are transmitted via different bands. According to this embodiment, the symbol acquisition apparatus 100 comprises a receiving module 20 and a control module 80. The receiving module 20 comprises a boundary generating unit 40, a confidence value generating unit 60 and a power detector 70. The boundary generating unit 40 sequentially estimates four symbol boundaries SB1, SB2, SB3 and SB4 respectively corresponding to preamble symbols $P_1$, $P_2$, $P_3$ and $P_4$ according to the preamble symbols of the received signal R. The confidence value generating unit 60 respectively estimates four confidence values CFD1, CFD2, CFD3 and CFD4 according to the received signal R to represent signal qualities of the preamble symbols $P_1$, $P_2$, $P_3$ and $P_4$, respectively. In the present embodiment, the preamble symbols $P_1$, $P_2$, $P_3$, $P_4$ are transmitted via different bands, so that the signal qualities of the preamble symbols $P_1$, $P_2$, $P_3$, $P_4$ are substantially different, and the detected symbol boundaries SB1, SB2, SB3, SB4 are not periodical. Finally, the control module 80 selects a preferred symbol boundary from the symbol boundaries SB1, SB2, SB3 and SB4 according to the confidence values CFD1, CFD2, CFD3, CFD4 (that is, respectively represent the signal qualities of the preamble symbols $P_1$, $P_2$, $P_3$, $P_4$) to detect the following data symbols.

The boundary generating unit 40 comprises a match filter 42, a logical circuit 44, a sliding window adder 46 and a determining unit 48. The preamble symbol is a known signal, and the match filter 42 performs a cross correlation operation on the received signal R and the known preamble symbol $P_i$ to generate a plurality of correlative values $Corr_{i,1}, \ldots, Corr_{i,n}$. Please refer to the following equation for the operation theory of the match filter 42:

$$Corr_{i,n} = \sum_{t=0}^{127} P_{i,t} \cdot R_{n-t} \qquad \text{Equation (1)}$$

Wherein, $P_{i,t}$ denotes a $t^{th}$ sampled signal of an $i^{th}$ preamble symbol, and each preamble symbol comprises 128 sampled points.

The logical circuit 44 compares each of the correlative values $Corr_1, \ldots, Corr_n$ with a threshold value Vth_sb. In an embodiment, if the correlative value Corr is greater than the threshold value Vth_sb, the correlative value Corr keeps the same value; otherwise (if the correlative value Corr is not greater than the threshold value Vth_sb), the correlative value Corr is set to zero. Please refer to the following equation for the operation theory of the logical circuit 44:

$$Corr_{i,n} = \begin{cases} 0, \text{ if } |Corr_{i,n}| < \text{Vth\_sb} \\ Corr_{i,n} \end{cases} \qquad \text{Equation (2)}$$

That shows the logical circuit 44 is utilized for filtering out smaller correlative values Corr.

The plurality of correlative values $Corr_{1,1}, \ldots, Corr_{1,n}$ are sequentially sent into the sliding window adder 46. Assume that the size of the sliding window W1 corresponding to the adder 46 is 5, the sliding window adder 46 generates an operational value $CV\_sb_{1,1}$ by summing the correlative values $Corr_{1,1}, \ldots, Corr_{1,5}$. In the same manner, in the next operational time point, the sliding window adder 46 generates an operational value $CV\_sb_{1,2}$ by summing the correlative values $Corr_{1,2}, \ldots, Corr_{1,6}$. Please refer to the following equation showing the operation theory of the sliding window adder 46:

$$CV\_sb_{i,n} = \sum_{u=0}^{4} |Corr_{i,n-u}|^2 \qquad \text{Equation (3)}$$

Finally, the determining unit 48 selects a maximum value from the inputted operational values CV_sb, and determines the symbol boundary SB1 corresponding to the preamble symbol $P_1$ according to the position of the maximum value. Determining and obtaining the maximum value of the operational value CV_sb and determining the symbol boundary is covered within the scope of the related art and is omitted here for the sake of brevity.

The power detector 70 is utilized for constantly detecting the power value of each sampled point of the received signal R, and for outputting a power value Pwi when the maximum value of the operational values $CV\_sb_{i,n}$ is generated. The boundary generating unit 40 respectively generates different symbol boundaries SB1, SB2, SB3 and SB4 according to the four preamble symbols in the received signal R. Therefore, the power detector 70 then sequentially outputs four corresponding power values Pw1, Pw2, Pw3 and Pw4. In the present embodiment, the confidence value generating unit 60 comprises a match filter 62, a logical circuit 64, a sliding window adder 66 and a determining unit 68. In an embodiment, the operations of the match filter 62, the logical circuit 64 and the sliding window adder 66 are substantially similar to the above-mentioned components with same name, so please refer to the above-mentioned equations (1) through (3) for descriptions about the operations of the match filter 62, the logical circuit 64 and the sliding window adder 66. In a preferred embodiment, the threshold value Vth_cfd utilized by the logical circuit 64 can be greater than the threshold value Vth_sb utilized by the logical circuit 44, so that the signal qualities can be more precisely expressed. In addition, the sliding window W1 utilized by the sliding window adder 46 can be greater than the sliding window W2 utilized by the sliding window adder 66 to gather energy of the different patterns sufficiently. In the present embodiment, assume that the size of the sliding window W2 corresponding to the sliding window adder 66 is 3. The sliding window adder 66 generates the operational value $CV\_cfd_{i,1}$ by summing the correlative values $Corr_{i,1}, \ldots, Corr_{i,3}$ in the sliding window W2. In the same manner, in the next operational time point, the sliding window adder 66 generates an operational value $CV\_cfd_{i,2}$ by summing the correlative values $Corr_{i,2}, \ldots, Corr_{i,4}$. Finally, the determining unit 68 generates the confidence value CFD1 corresponding to the preamble symbol $P_1$ according to the ratios of the maximum value of the operational values CV_cfd to the power value Pw1. Please note that the method for generating the power values Pw1, Pw2, Pw3 and Pw4 is not limited to that utilized in the present embodiment; for example, the power detector 70 can directly output a power value of each sampled point of the received signal R. The determining unit 68 then respectively selects the power values Pw1, Pw2, Pw3 and Pw4 detected when the operational value CV_sb is the maximum value.

Finally, the control module 80 selects a preferred symbol boundary from the symbol boundaries SB1, SB2, SB3 and SB4 according to the confidence values CFD1, CFD2, CFD3 and CFD4. For example, assume that the confidence values CFD1, CFD2, CFD3 and CFD4 respectively are 0.75, 0.5, 0.75 and 0.82, that means the symbol boundary SB4 has the greatest reliability than other symbol boundaries (i.e., the symbol boundary SB4 is the most reliable). Therefore, the control module 80 selects the symbol boundary SB4 as a preferred symbol boundary $SB_{opt}$. Please note that another embodiment of the present invention can generate a preferred symbol boundary $SB_{opt}$ by calculating a weighted average of the symbol boundaries SB1, SB2, SB3 and SB4 according to the confidence values CFD1, CFD2, CFD3 and CFD4. The present invention match filters 42, 62 and the sliding window adders 46, 66 belong to the scope of a related art, therefore the related description is omitted here for the sake of brevity.

In addition, both of the boundary generating unit 40 and the confidence value generating unit 60 comprise the match filters 42 and 62. Therefore, in the present invention, the two match filters 42 and 62 can be combined and the outputted correlative value Corr can be sent simultaneously to the logical circuits 44 and 64. Similarly, logical circuits 44 and 46 can be combined, and the sliding window adders 46 and 66 can be combined according to design considerations.

Figure 2:
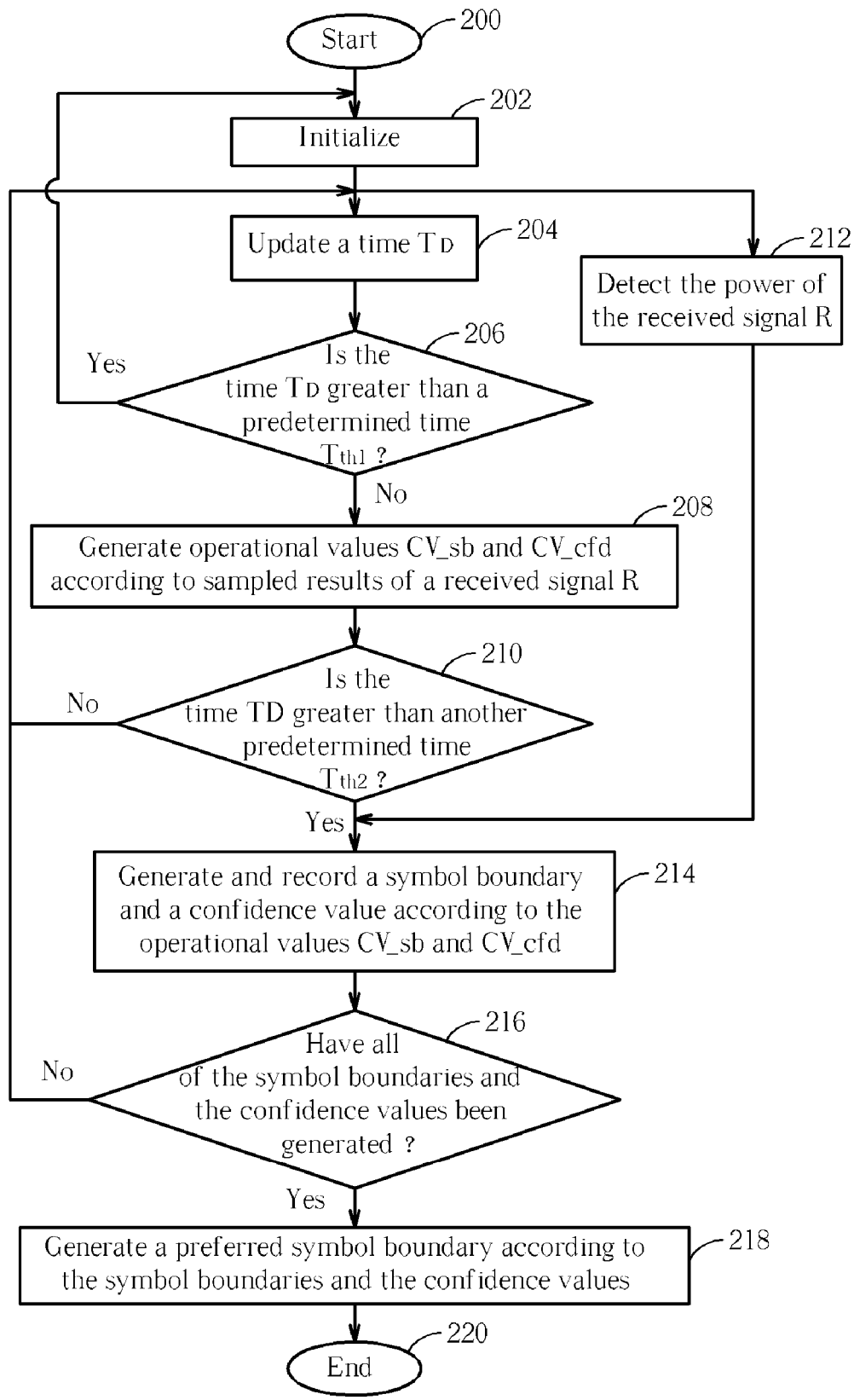
FIG. 2 is a flowchart of an embodiment of the method for determining a symbol boundary symbol according to the present invention.

Please refer to FIG. 2. FIG. 2 is a flowchart of an embodiment of the method for determining a symbol boundary symbol according to the present invention. As shown in FIG. 2, an initialization step must be executed when symbol boundary detection beginning (step 202); for example, the time $T_D$ is reset to 0. Next, the step 204 is to update the time $T_D$ expanded on detecting the preamble symbol and to compare the time $T_D$ with the predetermined time $T_{th1}$ (step 206). When the time $T_D$ is far more than a cycle of a preamble symbol, the operation of detecting the symbol boundary of the preamble symbol is terminated and the initialization step is then restarted; otherwise, the operational values CV_sb and CV_cfd are generated according to the sampled results of the received signal R (step 208) and the power of the received signal R is to be detected to generate a corresponding power value (step 212). Next, further determine the sequentially inputted operational values CV_sb whether comprising a maximum value or not, then a symbol boundary SB is determined according to the maximum value, and a confidence value CFD is generated according to the operational values CV_cfd and a power value Pw detected when the maximum value of the operational values CV_sb is generated. Then, the time $T_D$ is reset to 0 (step 214) to re-detect a symbol boundary SB and a confidence value CFD of a next preamble symbol. Please refer to the following equation for the method for generating the confidence value:

$$CFDi = \frac{CV\_cfd_{MAX}}{Pwi}, i = 1 \sim 4 \qquad \text{Equation (4)}$$

Wherein $CV\_cfd_{MAX}$ denotes a maximum value of the operational values CV_cfd. Finally, when the symbol boundaries SB1, SB2, SB3, SB4 and the confidence values CFD1, CFD2, CFD3, CFD4 (respectively corresponding to the preamble symbols $P_1$, $P_2$, $P_3$, $P_4$) have been generated, a preferred symbol boundary $SB_{opt}$ is generated according to the symbol boundaries SB1, SB2, SB3, SB4 and the confidence values CFD1, CFD2, CFD3, CFD4 (step 218). The maximum value of the operational values CV_sb is not generated immediately when the detection of the preamble symbol(s) is just starting, therefore, in a preferred embodiment, the present invention compares a predetermined time $T_{th2}$ with the time $T_D$ (step 210). In this way, the probability of misjudging the maximum value of the operational values CV_sb can be reduced by utilizing the predetermined time $T_{th2}$ omitting a portion of operational values CV_sb.

Figure 3:
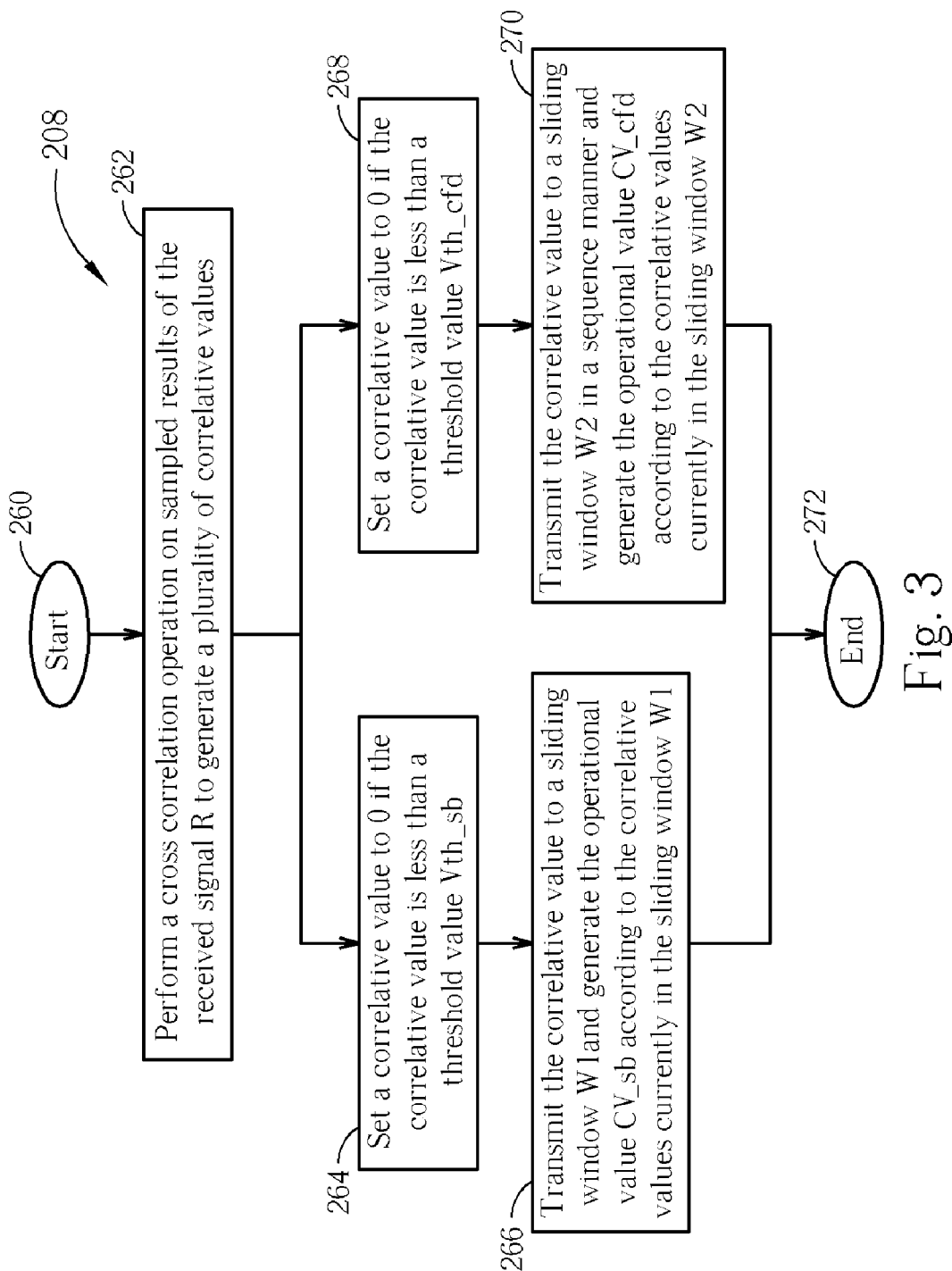
FIG. 3 is a detailed flowchart of step 208 shown in FIG. 2. Please refer to FIG. 3 and FIG. 1.

FIG. 3 is a detailed flowchart of step 208 shown in FIG. 2. Please refer to FIG. 3 and FIG. 1. The method for determining a symbol boundary according to the present invention utilizes the match filters 42 and 62 to perform a cross correlation operation on sampled results of the received signal R and generate a plurality of correlative values (step 262), then utilizes the logical circuit 44 to compare each of the correlative values with the threshold value Vth_sb. If a correlative value is less than the threshold value Vth_sb, the correlative value is set to 0 (step 264) to reduce the possibility of misjudging the symbol boundary, and then the correlative value is transmitted to the sliding window W1. In the end, the sliding window adder 46 sums the correlative values in the sliding window up to generate the operational value CV_sb (step 266). Similarly, while step 264 is executing, the logical circuit 64 compares the correlative value and the threshold value Vth_cfd. If the correlative value is less then the threshold value Vth_cfd, the correlative value is set to 0 (step 268) and then the correlative value is transmitted to the sliding window W2. Finally, the sliding window adder 66 sums the correlative value in the sliding window to generate the operational value CV_cfd (step 270). It should be noted that step 264 and step 268 are independent of one another. Therefore, if step 264 sets a certain correlative value to 0, the correlative value utilized in step 268 is not influenced. After steps 266 and 270 are completed, step 208 is completed and step 210 shown in FIG. 2 is then performed.

In the present embodiment, the present invention selects a symbol boundary with a higher accuracy according to confidence values, or calculates another symbol boundary by a weighted averages method to detect the following data symbols. On the other hands, the threshold values Vth_cfd and CV_cfd could also be designed to be a adjustable value or a dynamic changing value. For example, when the transmitting environment become worse, the symbol acquisition apparatus 100 changes the threshold values Vth_cfd and CV_cfd dynamically for increasing the correctness of symbol boundary acquisition. In addition, when the multi-band communication system detects corresponding symbol boundaries of several preamble symbols, the multi-band communication system determines that a packet has been received. In this way, the present invention method can also be utilized for detecting a packet.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining a symbol boundary, comprising:
   receiving a first preamble symbol;
   determining a first boundary according to the first preamble symbol by:
   performing a cross correlation operation on the first preamble symbol to generate a plurality of first correlation values;
   respectively summing a first predetermined amount of the first correlation values of to generate a plurality of first operational values; and
   determining the first boundary by comparing the first operational values;
   generating a first confidence value according to signal quality of the first preamble symbol, the first confidence value indicating a reliability of the first boundary, wherein the step of generating the first confidence value further comprises:
   generating a first power value corresponding to the first boundary according to the first preamble symbol;
   respectively summing a second predetermined amount of the first correlation values to generate a plurality of third operational values; and
   generating the first confidence value according to the third operational values and the first power value;
   receiving a second preamble symbol;
   determining a second boundary according to the second preamble symbol;
   generating a second confidence value according to signal quality of the second preamble symbol, the second confidence value indicating a reliability of the second boundary; and
   determining a symbol boundary from the first and the second boundaries according to the first and the second confidence values.

2. The method of claim 1, further comprising:
   comparing each first correlation value with a first threshold value, and decreasing the first correlation value if the first correlation value is smaller than the first threshold value.

3. The method of claim 1, further comprising:
   determining the first boundary to be the symbol boundary if the first confidence value is greater than the second confidence value.

4. The method of claim 1 being applied to a multi-band communication system, wherein the first preamble symbol corresponds to a first band, and the second preamble symbol corresponds to a second band.

5. The method of claim 4, wherein when the multi-band communication system detects the symbol boundary, the multi-band communication system determines that a packet has been received.

6. The method of claim 1, wherein the format of the first and second preamble symbols complies with IEEE 802.15.3a specification.

7. The method of claim 1, being applied to an ultra wideband communication system.

8. A symbol acquisition apparatus for determining a symbol boundary, comprising:
   a receiving module receiving a first preamble symbol and a second preamble symbol, for determining a first and a second boundaries respectively according to the first and the second preamble symbols, and generating a first and a second confidence values respectively according to signal quality of the first preamble symbol and signal quality of the second preamble symbol, the first and the second confidence values respectively indicating a reliability of the first boundary and a reliability of the second boundary; wherein the receiving module comprises;
   a boundary generating unit for generating the first boundary and the second boundary respectively according to the first preamble symbol and the second preamble symbol;
   a confidence value generating unit for generating the first confidence value and the second confidence value respectively according to the first preamble symbol and the second preamble symbol; and
   a power detector for generating a first power value and a second power value respectively according to the first preamble symbol and the second preamble symbol;
   wherein the confidence value generating unit generates the first and the second confidence values according to the first power value, the second power value, the first preamble symbol, and the second preamble symbol; and
   a control module coupled to the receiving module, for determining the symbol boundary from the first boundary and the second boundary according to the first confidence value and the second confidence value.

9. The symbol acquisition apparatus of claim 8, wherein the boundary generating unit comprises:
   a match filter for respectively performing a cross correlation operation on the first and second preamble symbols to generate a plurality of first correlation values and a plurality of second correlation values;
   an adder for respectively summing a first predetermined amount of the first correlation values to generate a plurality of first operational values, and for respectively summing a second predetermined amount of the second correlation values to generate a plurality of second operational values; and
   a determining unit for determining the first boundary and the second boundary respectively according to the first operational values and the second operational values.

10. The symbol acquisition apparatus of claim 9, wherein the determining unit determines the first boundary and the second boundary respectively according to the comparison results of the first operational values and the comparison results of the second operational values.

11. The symbol acquisition apparatus of claim 9, wherein the boundary generating unit further comprises:
   a logical circuit for reducing the first correlation value when a first correlation value is smaller than a first threshold value, and for reducing the second correlation value when a second correlation value is less than a second threshold value.

12. The symbol acquisition apparatus of claim 11, wherein the confidence value generating unit is substantially similar to the boundary generating unit.

13. The symbol acquisition apparatus of claim 8, wherein the control module chooses the first boundary to be the symbol boundary when the first confidence value is greater than the second confidence value.

14. The symbol acquisition apparatus of claim 8, being applied to a multi-band communication system, wherein the first preamble symbol corresponds to a first band, and the second preamble symbol corresponds to a second band.

15. The symbol acquisition apparatus of claim 14, wherein the multi-band communication system determines that it has received a package when detecting the symbol boundary.

16. The symbol acquisition apparatus of claim 8, being applied to an ultra wideband communication system.

17. A method for determining a symbol boundary, comprising:
   receiving a first preamble symbol;
   determining a first boundary according to the first preamble symbol;
   performing a cross correlation operation on the first preamble symbol to generate a plurality of first correlation values;
   respectively summing a predetermined amount of the first correlation values to generate a plurality of first operational values;
   generating a first power value corresponding to the first boundary according to the first preamble symbol;
   generating a first confidence value according to the first operational values and the first power value;
   receiving a second preamble symbol;
   determining a second boundary according to the second preamble symbol and generating a second confidence value according to signal quality of the second preamble symbol; and
   determining a symbol boundary from the first and the second boundaries according to the first and the second confidence values.

* * * * *